Figure 1:
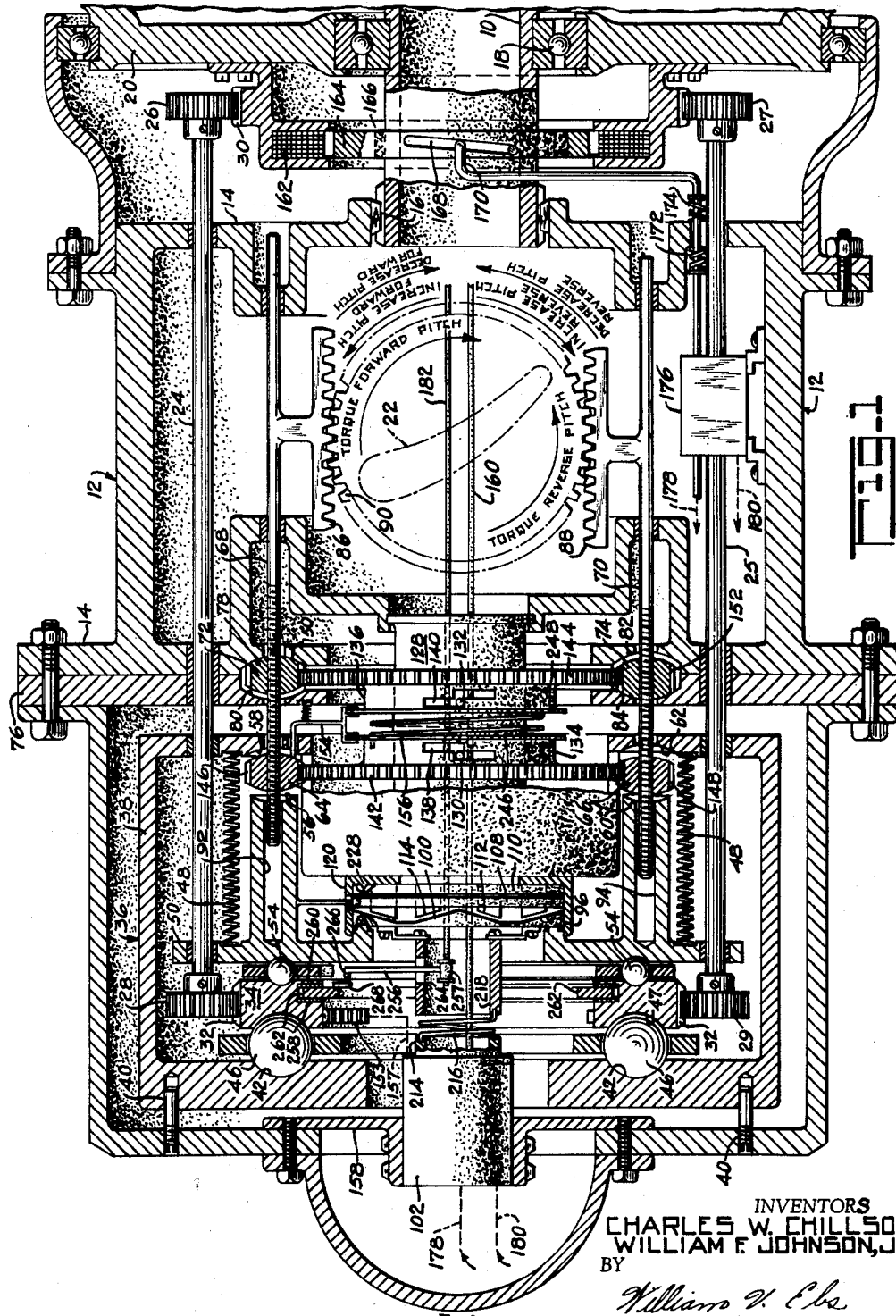

June 1, 1965 C. W. CHILLSON ETAL 3,186,492
MECHANICAL PITCH CONTROL SYSTEM FOR AIRCRAFT PROPELLERS
Filed March 30, 1964 4 Sheets-Sheet 1

THE PROPELLER ROTATES CLOCKWISE

INVENTORS
CHARLES W. CHILLSON
WILLIAM F. JOHNSON, JR
BY
William V. Ebs
THEIR ATTORNEY INVENTORS
CHARLES W. CHILLSON
WILLIAM F. JOHNSON, JR
BY
William V. Ebs
THEIR ATTORNEY

United States Patent Office 3,186,492
Patented June 1, 1965

3,186,492
MECHANICAL PITCH CONTROL SYSTEM FOR AIRCRAFT PROPELLERS
Charles W. Chillson, Wayne, and William F. Johnson, Jr., Ridgewood, N.J., assignors to Curtiss-Wright Corporation, a corporation of Delaware
Filed Mar. 30, 1964, Ser. No. 355,630
20 Claims. (Cl. 170—135.29)

The invention of this application, which is a continuation in part of an application for United States Letters Patent, Serial No. 34,139, filed June 6, 1960, now abandoned, relates to pitch control systems for aircraft propellers. In particular, the invention is concerned with a uniquely constructed self-contained mechanical pitch control system which is independent of auxiliary power sources in the aircraft.

Advances in the propeller art have not kept pace with advances in aircraft and engine performance. Various attempts have been made to adapt existing propeller systems to new requirements in aircraft and engine performance. However, the attempts have not been satisfactory, due in large measure to the interdependence in the existing systems on hydraulic, mechanical and electrical components. By and large, adaptation measures have resulted in increased cost, added weight and undue complexity.

An object of this invention is to provide a new type pitch control system capable of performing all required functions, but with a minimum number of parts such as to assure minimum cost and maximum reliability.

Another object of the invention is to provide a mechanical system of the described type which insofar as power requirements are concerned is operated solely and directly from an aircraft engine without the use of clutching devices or the like.

Still another object of the invention is to provide a pitch control system of the described type having pitch change mechanism constructed in such a manner that a minimum number of parts move while under load.

Other objects and advantages of the invention will become apparent during a reading of the specification taken in connection with the accompanying drawings.

The system of the invention incorporates pitch changing mechanism of novel construction, including an expander and sets of holding and lifting nuts threaded on pairs of blade-gear racks. The expander is driven by the aircraft engine acting through the propeller hub structure and cam means, and is thereby caused to expand and contract to alternately load and unload the nuts. Blade pitch is controlled according to signals from a mechanical governing device which rotates as a unit with the propeller and functions to relatively position cam members in the pitch changing mechanism. The cam members, as positioned by the governing device, cause the nuts to be rotated when free of load. The blade-gear racks are moved axially by expander action in accordance with the positioning of the nuts and the propeller blades are thereby caused to assume new pitch positions. In the absence of a control signal from the governing device rotation of the nuts on the blade-gear racks cannot occur and propeller pitch remains fixed. The governing device maintains a constant speed of rotation of the propeller in both forward and reverse pitch, the particular constant speed at which the propeller rotates being selectable at will. Other control mechanism, rotatable with the propeller, acts through the governing device to provide for the phase synchronization of multiple propeller units. Manually controllable mechanism is available for causing the propeller blades to be driven rapidly to a feather position when this is required.

Figure 2:
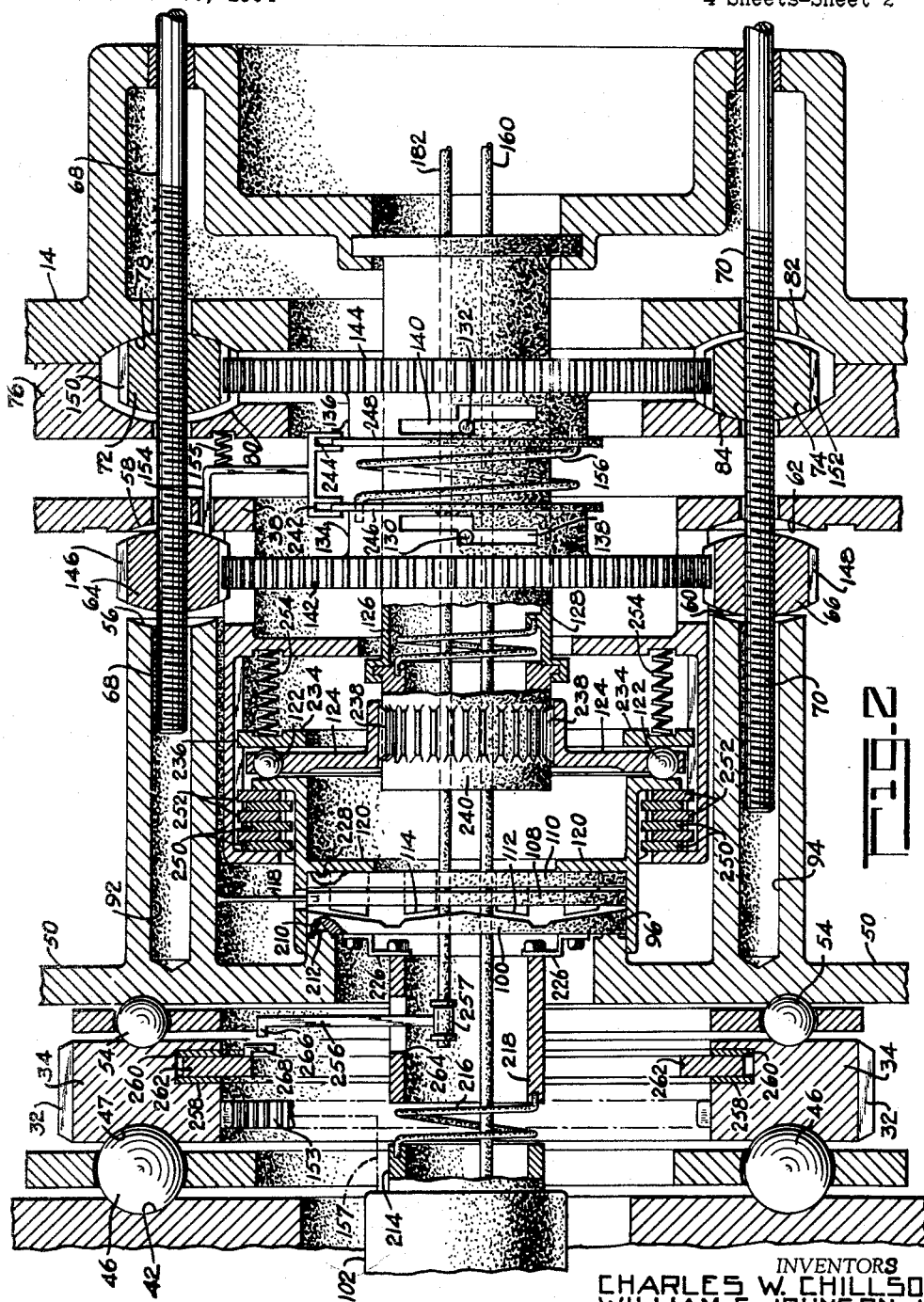
Figure 3:
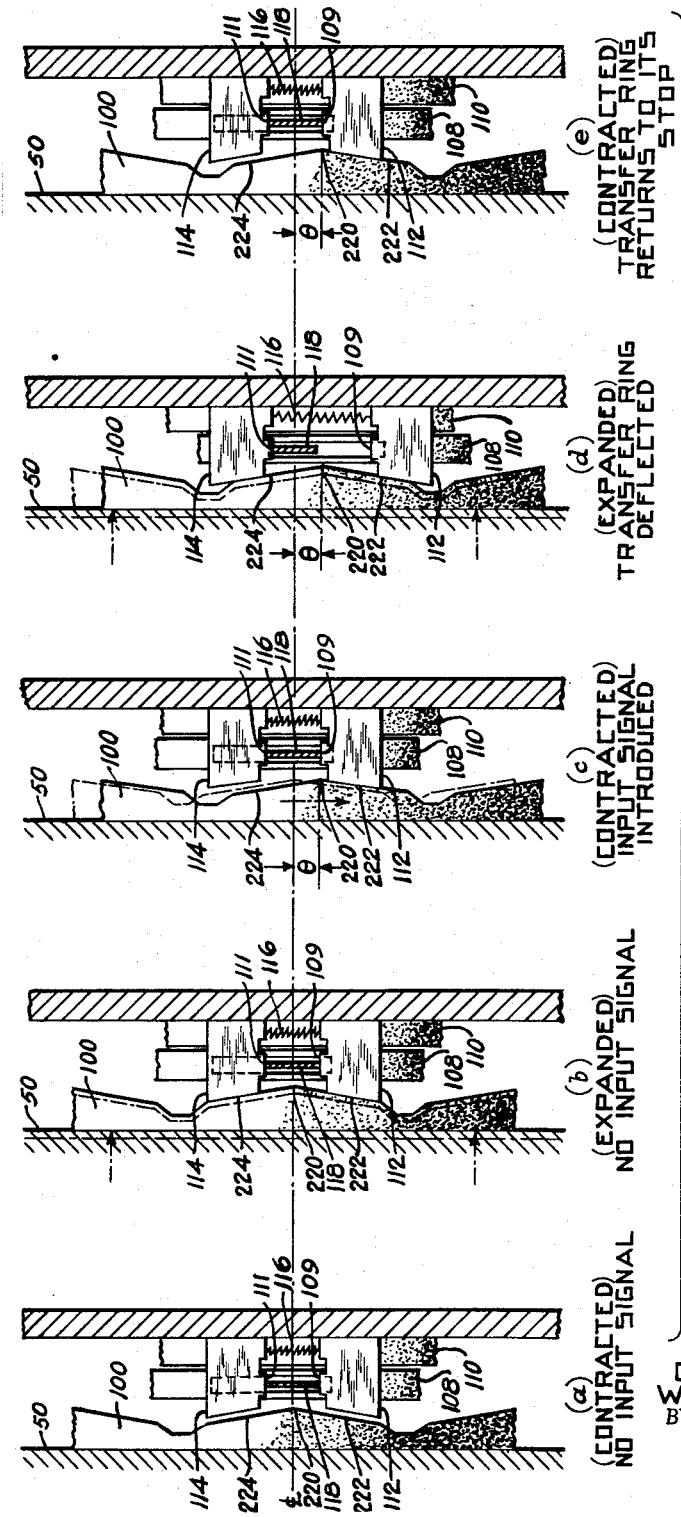
Figure 4:
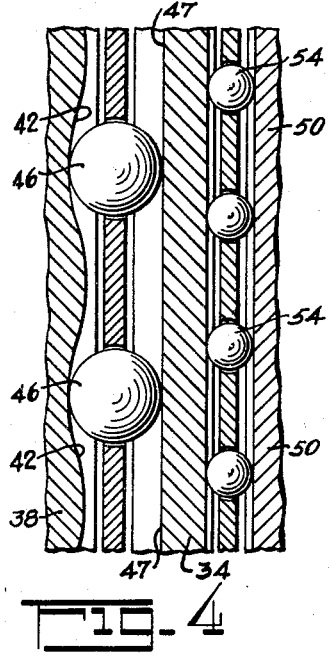
Figure 5:
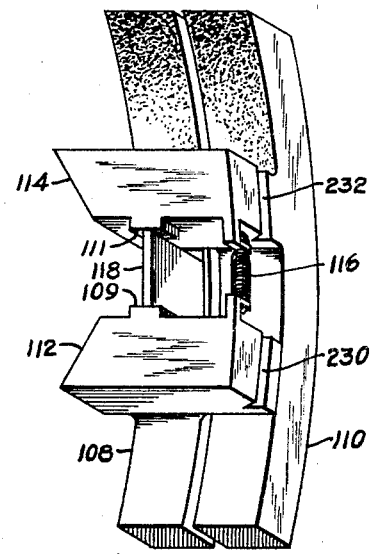
Figure 6:
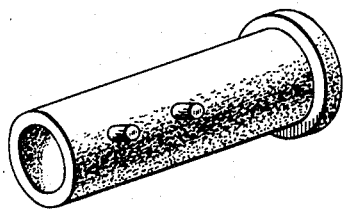

Referring to the drawings:
FIG. 1 is a longitudinal sectional view, somewhat diagrammatic in character, showing a propeller embodying the features of the invention,
FIG. 2 is an enlarged fragmentary longitudinal sectional view showing a portion of the mechanism of FIG. 1,
FIG. 3 is a diagrammatic view illustrating the operation of interacting pitch controlling cams,
FIG. 4 is an enlarged fragmentary developed sectional view showing mechanism for imparting reciprocating motion to parts of the propeller,
FIG. 5 is an enlarged fragmentary perspective view showing the cams of FIG. 3, and
FIG. 6 is an enlarged perspective view of one element of the mechanism of FIGS. 1 and 2.

In FIG. 1 of the drawing, reference character 10 designates an engine drive shaft, which shaft constitutes the means of transmitting power to the propeller 12 of the invention. The shaft 10 imparts rotation to the propeller through a spline connection with the propeller hub 14 at 16. The propeller is rotationally supported by the drive shaft 10 on bearings including the bearing 18 located at the forward end of engine casing 20 between the engine casing and drive shaft. Reference character 22 represents the outline of a propeller blade which is mounted in the usual manner in the hub structure 14 for rotation therewith.

Rotatably mounted in hub structure 14 is a shaft 24 on opposite ends of which are affixed the gears 26 and 28. Shaft 25, which includes the gears 27 and 29, is also rotatably mounted in hub structure 14. Gears 26 and 27 mesh with a gear 30 which is fixedly secured with respect to the engine casing 20. Accordingly as the hub structure 14 is rotated by drive shaft 10, gears 26 and 27 move around gear 30, imparting rotation to shafts 24 and 25, and to the gears 28 and 29. Gears 28 and 29 mesh with a gear 32 on one element 34 of an expander mechanism 36. Gears 28, 29 and 32 may be of the same diameter as gears 26, 27 and 30 respectively, in which event element 34 remains fixed with respect to the engine casing or the gear diameters may be proportioned to impart some rotative speed to element 34, which speed should be substantially less than propeller speed. The purpose of maintaining element 34 fixed or in the alternative having it rotate at slow speed will shortly become apparent.

The expander mechanism 36 is a continuously reciprocated mechanism embraced by and including bridge-structure 38 which is mounted as at 40 in hub secured structure for rotation with hub structure 14, and for relative movement with respect to such hub structure in a direction parallel to the propeller axis of rotation. The bridge structure 38 rotates at a substantial speed relative to element 34 and simultaneously reciprocates at a rate dependent upon such relative speed. Actuating elements for inducing reciprocation include wavy annular cam 42 on bridge structure 38, and suitably retained balls 46 in contact with the cam track and with the bottom of annular groove 47 in element 34 (FIG. 4). The cam 42 and element 34 are biased toward each other, and tend to move the balls 46 into the valleys of the cam, the biasing force being due to the action of springs 48. As shown, the springs react against the bridge structure 38 tending to move cam 42 to the right, as viewed in FIG. 1, and against another expander member 50, which member acts through balls 54 tending to move element 34 to the left. However, as bridge structure 38 is driven rotationally, its cam track 42 rotates relative to element 34 and, due to the presence of the interposed balls 46, bridge structure 38 and element 34 are caused to move toward and away from each other cyclically. Member 50 follows the movement of member 34.

Oppositely disposed portions of member 50 and bridge structure 38 are recessed as at 56, 58 and 60, 62 to provide seats for nuts 64 and 66 which are threaded on screw rods 68 and 70 respectively. Screw rods 68 and 70 also have nuts 72 and 74 respectively threaded thereon. The nuts 72 and 74 are located between oppositely disposed recessed seats in hub structure 14 and hub attached member 76. As shown, recesses 78 and 80 are provided in hub structure 14 and member 76 respectively for nut 72, and similar recesses 82 and 84 are provided in hub structure 14 and member 76 respectively for nut 74. The screw rods 68 and 70 include racks 86 and 88 respectively as integral parts thereof, which racks engage opposite sides of a blade gear 90 that is secured to the propeller blade 22 in a conventional manner. The screw rods and nuts thereon, as well as member 50, all rotate with the propeller. The screw rods are also subject to longitudinal movement, and member 50 is adapted as at 92 and 94 to permit such longitudinal movement. Pitch change of the propeller blade is accomplished by actuation of blade gear 90 in response to longitudinal movement of the racks 86 and 88 in opposite directions. Although not shown in the drawing, it will be appreciated that a number of pairs of racks and screw rods, with associated blade gears and nuts, spaced around the propeller assembly are required, according to the number of propeller blades, for accomplishing pitch change in all such blades. Only one blade 22 and associated mechanism has been shown since all blades would be similarly controlled.

Reference character 96 designates a ring which, as shown, has a V-shaped annular groove 210 on the one side thereof. The groove is one element of a clutch, the other element of which is the annular projection 212 formed on member 50. An annular cam 100 is formed on the ring 96 on the side opposite from the clutch. The ring 96 and cam 100 are positionable in a rotational sense, when the said clutch is disengaged, by a governor 102 acting through shaft 214, torsion spring 216, and shaft 218.

Annular cam 100 faces a ring assembly comprising an increase pitch transfer ring 108 and a decrease pitch transfer ring 110 (see FIGS. 1, 2, 3, and 5). Ring 108 includes a plurality of cam members 112, and ring 110 includes a plurality of cam members 114. A spring 116 and a stop 118 which is integral with member 50 and therefore rotationally fixed with respect to hub structure, define a neutral rotational position for the cam members, in which position the abutments 109 and 111 on transfer rings 108 and 110 respectively are biased by the spring into engaging positions with the stop.

With the expander mechanism contracted, that is, with the balls 46 in the valleys of cam 42, and in the absence of a signal from the governor, the annular cam 100 is disposed as shown in FIGS. 1, 2 and 3(a). Cam 100 is separated from cam members 112 and 114, and the apex 220 at the intersection of each pair of adjacent opposite sloping cam surfaces 222 and 224 on cam 100 lies midway between adjacent cam members 112 and 114. When the mechanism 36 expands, that is, as the balls 46 roll up the ramps of cam 42, cam 100 is moved by member 50 into forced contact with cam members 112 and 114 (FIG. 3(b)). Cam members 112 and 114 remain in their neutral positions during expansion and contraction of mechanism 36 for as long as cam 100 remains unactuated by a signal from governor 102.

The cam 100 moves in response to a signal from the governor in the contracted condition of expander mechanism 36. At this time the clutch formed by projection 212 on member 50 and the groove 210 on ring 96 is disengaged and ring 96 may be rotated relative to member 50. Assuming a governor signal acting through shaft 214, spring 216, and shaft 218 in a direction to move the portion of cam 100 shown in FIG. 3 downwardly, said cam 100 moves during contraction of mechanism 36 until it contacts the cam members 112 (FIG. 2(c), that is through the angular distance θ. When the mechanism 36 expands, cam 100 acts on cam members 112 and forces increase pitch transfer ring 108 to rotate through a small angle against the action of spring 116 (FIG. 2(d)). During the forced engagement of cam 100 with the cam members 112, the clutch comprising the annular groove 210 in ring 96 and the annular projection 212 on member 50 is engaged, the projection 212 being then wedged tightly in the groove 210, such that the ring 96 cannot rotate relative to member 50. Upon contraction, transfer ring 108 is moved by spring 116 back into its original position wherein element 109 contacts stop 118 (FIG. 2(e)). Subsequent expansions and contractions of mechanism 36 result in recurring movements of the increase transfer ring 108 as described, until the governor signal is eliminated, causing cam 100 to return to its original no-signal position. The cam 100 and cam members 114 function in a similar manner to that already described to intermittently move the decrease transfer ring 110 upwardly as viewed in the FIG. 3, when the governor signal is such as to move the cam 100 upwardly. It will be noted that arms 226 connect the cam bearing ring 100 to shaft 218. Such arms 226 should be sufficiently flexible to permit axial movement of the cam 100 relative to shaft 218 during expansion and contraction of the mechanism 36.

Rotational movements of pitch transfer ring 108 and 110 are transmitted to member 120, the member 120 being provided with an annular projection 228 (FIGS. 1 and 2) which tightly engages the sides of V-shaped annular grooves 230 (FIG. 5) in cam member 112 to prevent relative motion of the ring 108 and member 120 whenever the transfer ring 108 is being actuated in response to a governor signal, and which tightly engages the sides of V-shaped annular grooves 232 in cam member 114 to prevent relative motion of the ring 110 and member 120 whenever the transfer ring 110 is being actuated. The member 120 imparts rotation to a member 124 by causing balls 122 which are retained in the member 124 and which contact both member 120 and the member 234 to roll on the surface of said member 234. The member 234 is spline connected at 236 to member 38, as shown, rotation of the member 234 relative to member 38 being thereby prevented. Member 234 connects through splines at 238 with cylindrical member 240 and therefore imparts rotational movements to the said member 240. Member 240 connects through energy-storing means such as spring 126 with cylindrical member 128. The member 128 includes tabs 130 and 132 drivably engageable with cylindrical members 134 and 136 respectively in bayonet slots 138 and 140 therein. As shown, members 134 and 136 include gears 142 and 144 respectively. Gear 142 engages gears 146 and 148 on nuts 64 and 66 respectively, and gear 144 engages gears 150 and 152 on nuts 72 and 74 respectively. The members 134 and 136 are engaged by an adjuster 154 which is maintained in contact with the nut 64 by spring 155. The adjuster is formed with yokes 242 and 244 which contact opposite sides of flanges 246 and 248 respectively on members 134 and 136 as shown.

Accidental movement of member 120 during contraction of mechanism 36 is prevented by means of friction brake plates 250 and 252 splined to members 120 and 38 respectively The brake plates are compressed during the contraction of mechanism 36 by spring 254 which acts through member 234, contacting balls 122, and member 120 to squeeze the brake plates 250 and 252 between the member 120 and bridge structure 38 such that the plates hold member 120 against rotational movement. Upon expansion of mechanism 36, bridge structure 38 moves to the left (FIG. 2), that is, away from the brake plates and the brake plates expand leaving member 120 free to move in response to a governor signal.

With the propeller blade 22 in forward pitch, torque acts on the propeller blade in a clockwise direction as viewed in FIG. 1 such that rod 68, with nuts 64 and 72, are urged into rightward positions in which nut 72 bears against seat 78 in the hub structure 14, whereas rod 70, with nuts 66 and 74, are urged to leftward positions in which nut 74 bears against seat 84 in hub attached member 76. In the said forward pitch condition of the propeller shown in both FIGS. 1 and 2, nut 64 acts on the adjuster 154 causing members 134 and 136 to assume rightward positions such that the tabs 130 and 132 thereon are disposed in leftward portions of slots 138 and 140. With propeller blade 22 in reverse pitch, torque acts on the blade in a counterclockwise direction. As a result rod 68 with nuts 64 and 72 are urged by spring 155 to leftward positions in which nut 72 bears against seat 80 in member 76, whereas rod 70 with nuts 66 and 74 are urged to rightward positions in which nut 74 bears against seat 82 in hub structure 14. In reverse pitch the members 134 and 136 are positioned to the left by spring 155 acting through adjuster 154 such that tabs 130 and 132 are disposed in the rightward portions of slots 138 and 140. In reverse pitch nuts 64 and 66 are separated a slight distance from the walls of recesses 56 and 62 respectively in member 50 and member 38.

Let it be assumed that the propeller blade 22 is in some forward pitch position as shown in FIG. 1 such that nuts 72 and 74 are urged to contacting positions with surfaces of recesses 78 and 84 respectively, and nuts 64 and 66 are urged to positions in which they are spaced a slight distance from recesses 58 and 60 respectively. Reciprocating motion of bridge structure 38 due to propeller rotation and the interaction of cam 42 with the balls 46, results in nut 64 being periodically engaged and moved to the left by seat 58 on the bridge structure while nut 66 is engaged and moved to the right by seat 60 on member 50. An oscillatory motion is thereby imparted to the screw rods, racks, and propeller blade 22. The nuts 72 and 74 are periodically raised from their seats and thereby relieved of load due to torque on the blade whereupon the load is assumed by nuts 64 and 66. While unloaded the nuts 72 and 74 may be turned on screw rods 68 and 70 respectively in response to a governor signal.

As indicated hereinbefore, a governor signal results in intermittent rotational movement of member 120 for as long as a signal persists. An increase pitch signal occurring while the propeller is in forward pitch, results in member 120 being moved during expansions of mechanism 36 in a direction such that the member 120 acting through member 124, spring 126, and member 128, causes tab 132 to act downwardly, as viewed in FIGS. 1 and 2 against the end of the leftward portion of slot 140 in member 136. The tab 130 is free to move downwardly in the leftward portion of slot 138. Rotational movement is urged upon member 136 by tab 132 and member 136 acts through the gear 144 in engagement with gears 150 and 152 to cause the nuts 72 and 74, when unloaded and raised from their seats 78 and 84, to be turned on the screw rods 68 and 70 respectively. Nut 72 is moved to the right on screw rod 68 as viewed in FIG. 1 and nut 74 is moved to the left on screw rod 70. Any motion of the member 120 and member 124 occurring during periods in which the nuts 72 and 74 are loaded winds up spring 126 inasmuch as the nuts cannot rotate when under load. The energy stored in the spring in this manner is released when nuts are unloaded, and the nuts 72 and 74 are turned thereby. A follow-up spring 156 connects members 134 and 136. This spring is wound up during the turning of nuts 72 and 74, i.e. while nuts 64 and 66 are loaded and member 134 is therefore restrained against rotation. The spring 156 functions to turn nuts 64 and 66 when they are unloaded such that they are moved to the right and left respectively to maintain a predetermined distance between the nuts on each screw rod. Recurrent turning of the two pairs of nuts on the screw rods in response to the increase pitch signal results in racks 86 and 88 being moved to new positions to the left and right respectively and the propeller blade 22 being moved counterclockwise to a new increased pitch position.

A decrease pitch signal occurring while the propeller is in forward pitch causes member 120 to be moved during expansions of mechanism 36 in a direction such that the member 120, acting through member 124, spring 126 and member 128, urges tabs 130 and 132 upwardly as viewed in FIG. 1. Tab 130 acts against the end of the leftward portion of slot 138 in member 134 whereby rotational movement is urged upon the member 134. Tab 132 is, however, free to move upwardly in the leftward portion of slot 140 in member 136. Movements of member 120 and member 124, occurring while the nuts 64 and 66 are loaded, cause energy to be stored in spring 126 for release when these nuts are unloaded. Gear 142, on member 134, turns nuts 64 and 66 through gears 146 and 148 when the nuts are free of load and separated from their seats 58 and 60. Nuts 64 and 66 are moved to the left and right respectively on their screw rods. Follow-up spring 156 is energized during the turning of the nuts 64 and 66, the nuts 72 and 74 being loaded at such time and member 136 therefore being held against rotation. The spring 156 turns nuts 72 and 74 when they are unloaded, moving the nut 72 to the left and nut 74 to the right to maintain the predetermined spacing between the nuts on each of the screw rods. Progressive turning of the pairs of nuts on the screw rods in response to the decreased pitch signal results in racks 86 and 88 being moved to the right and left respectively, whereby propeller blade 22 is moved clockwise to a decreased pitch position.

As noted, in reverse pitch nuts 72 and 74 are urged to contacting positions with seats 80 and 82 respectively, and nuts 64 and 66 are urged to positions in which they are spaced only a slight distance from seats 56 and 62 respectively. Due to expander action nut 64 is periodically engaged by seat 56, and nut 66 is engaged by seat 62, such that the nuts 72 and 74 are raised from their seats and torque load is transferred from nuts 72 and 74 to nuts 64 and 66.

In reverse pitch the tabs 130 and 132 on member 128 are disposed in the rightward portions of slots 138 and 140 respectively. Furthermore, in reverse pitch, the directional sense of the governor output is reversed, that is, an increase pitch signal causes the tabs 130 and 132 to be moved upwardly as viewed in FIGS. 1 and 2, whereas a decrease pitch signal causes the tabs to be moved downwardly. The spring 126 temporarily stores energy as hereinbefore described when nuts cannot be immediately moved in response to an increase or decrease pitch signal due to load thereon. The energy is released and the nuts turned when the nuts are free of load. Assuming an increase pitch signal tab 132 moves upwardly to drivably engage member 136 at the end of the rightward portion of slot 140; tab 130, however, is free to move in the rightward portion of slot 138 in member 134. Nuts 72 and 74 are turned when unloaded and thereby moved to the left and right respectively on their screw rods. Nuts 64 and 66 are thereafter caused to follow nuts 72 and 74 by reason of follow-up spring 156. The racks 86 and 88 move to the right and left respectively so that propeller blade 22 is turned clockwise to an increased pitch position.

In the case of a decrease pitch signal tab 130 moves downwardly to drivably engage member 134 at the end of the rightward portion of slot 138. Tab 132 is free to move in the rightward portion of slot 140 in member 136. Nuts 64 and 66 are turned when unloaded so as to move to the right and left respectively on their screw rods, and nuts 72 and 74 are thereafter caused to follow by reason of the action of spring 156. Racks 86 and 88 move to the left and right respectively and propeller blade 22 is thereby turned counterclockwise to a decreased pitch position.

The governor is preferably of the type disclosed in Patent 3,008,355, issued November 14, 1961 to Edward K.

Hine, for Mechanical Speed Control, and as such includes amplifying means for providing an output signal of substantial magnitude. Power for the governor amplifier is obtained from element 34 which is geared at 153 to an amplifier power input connection 157. The governor is secured by structure 158 to the hub attached structure for rotation thereby. Operation of the governor is dependent both upon propeller speed and upon the setting of a scheduler 160. The setting of scheduler 160 defines a desirable speed for the propeller and the governor functions upon the occurrence of speed deviations to provide an output signal which positions cam 100 in such a manner that the blades of the propeller are adjusted in pitch through the described nut, screw and rack system to cause the propeller to resume the desired speed of rotation. Preferably, suitable means are provided for coordinating the position of scheduler 160 with the positioning of a pilot's power lever to establish a type of propeller control action appropriate to the airplane's operating regime.

The directional sense of the governor output is reversible, as mentioned hereinbefore, so as to provide for reverse pitch governing, reverse operation being brought about upon appropriate positioning of the scheduler as when the power lever is moved into or out of the reverse pitch operating regime. Assuming that the propeller blades are in a forward pitch position, an increase in propeller speed over scheduler speed causes the blade 22, for example, to be rotated on its longitudinal axis in a counterclockwise direction to an increased pitch position, whereas a decrease in propeller speed causes the blade to be rotated in a clockwise direction to decrease pitch. With the propeller blades in reverse pitch an overspeed condition causes blade 22 to be rotated on its longitudinal axis in a clockwise direction to a new pitch direction, and an underspeed condition causes the blade to be rotated in a counterclockwise direction to a new pitch position.

Governor operation in addition to being dependent upon propeller speed and upon the setting of scheduler 160 may also be dependent upon phase signals by means of which the propeller of FIG. 1 may be maintained in phase synchronization with other propellers of a multi-engine aircraft. Apparatus for providing phase synchronization preferably includes an alternator comprising a coil wound stator 162 fixedly secured with respect to the engine casing by suitable structure, and a permanent magnet rotor 164 mounted as at 166 on low friction bearings for rotation with respect to the engine casing. The rotor 164 includes a cam slot 168 which is engaged by an actuation member 170. As shown, actuation member 170 is biased by springs 172 and 174 which cause it to seek a middle or in phase position on the rotor 164. The actuation member rotates with the propeller and transmits such rotation to the rotor 164. With similar phase synchronizing apparatus provided in each of the propellers of a multi-engine aircraft and the rotors of the various alternators connected to provide a system such as shown in Patent 3,048,743, issued August 7, 1962 to Charles W. Chillson, for Multi-Power Plant Synchronizing System, any deviation in phase of one propeller as compared to the other propellers gives rise to a signal useful in correcting the deviation.

Assuming a deviation in phase of the propeller of FIG. 1, a voltage is induced in the stator 162 resulting in a force on the rotor 164 such that the speed of the rotor is altered. Relative rotation of the rotor and the actuation member 170 results whereupon the cam slot 168 causes the actuation member to be translated longitudinally. Such longitudinal motion is employed in correcting the phase deviation. As shown the actuation member connects with a hub secured device 176 which is powered by shaft 25, but which derives its input signal from the longitudinal motion of actuation member 170. The device 176 is an integrating and proportioning device of the type disclosed in Patent 3,111,263, issued November 19, 1963 to Charles W. Chillson for Mechanical Integrating Device, and having outputs which respectively represent the input signal adjusted in gain and the integral of the input signal. Governor 102 is actuated in acocrdance with the outputs of device 176 through mechanical interconnections 178 and 180. Such actuation of the governor results in adjustment of the cam 100 which adjustment is reflected in the operation of the pitch change mechanism, and results in the propeller blades being adjusted in pitch in the extent required to maintain phase synchronization.

The scheduler may be positioned in an aircraft installation by the pilot's power lever operating through a coordinator, such coordinator having the function of establishing the type of propeller control action appropriate to the airplane operating regime. Alternatively, an independently operated power setting lever and an independently operated speed setting lever may be provided with the latter being directly connected to the scheduler.

The pitch changing mechanism of the invention is provided with suitable means for automatically accomplishing feathering of the propeller blades from a forward pitch position. Such means includes rod 182 which may connect with a pilot's feather lever for actuation thereby, a lever 256 mounted at 257 for pivotal movement on the rod 182 in a plane transverse to the propeller axis, and a slip clutch comprising friction rings 258 and 260 affixed in element 34 and a ring 262 frictionally restrained between the fixed rings. The ring 262 normally rotates with element 34 but slips on the fixed rings when restrained. The lever 256 extends through a slit 264 in shaft 218, and motion of the rod 182 to the left as viewed in FIGS. 1 and 2, bring a tab 266 on lever 256 into the path of a tab 268 on ring 262. Upon engagement of the tabs, lever 256 is caused to pivot on rod 182 and the lever thereupon engages the shaft 218 in the slit 264 causing the shaft to be rotated at a maximum rate through angle $\theta$ to a position of engagement between cam 100 and the members 112 on the increase pitch transfer ring. The ring 262 slips and the cam is maintained in the increase pitch position causing the propeller blades to be driven to their feather positions. The spring 216 between shafts 214 and 218 permits shaft 218 to be rotated by the lever 256 without feed back to the governor 102.

While only one form of the device incorporating the features of the invention has been shown, it will be apparent that various changes and modifications may be made therein by those skilled in the art without departing from the spirit and scope of the invention as set forth in the appended claims.

We claim:

1. The combination comprising a propeller blade; means for rotating the propeller blade to create thrust; reciprocating means driven by the blade rotating means; a member aligned in the direction of reciprocation, driven by the reciprocating means and operatively connected to adjust pitch of the blade; support means; a pair of controllably movable devices on said member, the member being biased by a torque on the propeller blade to a position in which one of the devices is loaded against the support means, the other device being actuated by operation of the reciprocating means to intermittently assume the load from said one device; means for translating the position of a device when unloaded; and means for altering the position of the other device when free of load according to the said translation to produce a translation of the member relative to the support means resulting in pitch adjustment of the propeller blade whereby speed of the propeller blade may be controlled.

2. The combination as defined in claim 1 wherein the reciprocating means includes a pair of rotatable members, one of which is rotated relative to the other by the blade rotating means; and cam means therebetween for producing the reciprocating motion.

3. The combination as defined in claim 2 wherein the said one rotatable member is rotated at the speed of the propeller blade.

4. The combination comprising a propeller blade;

means for rotating the propeller blade to create thrust; reciprocating means driven by the blade rotating means; a pair of members aligned in the direction of reciprocation, driven by the reciprocating means and operatively connected to adjust pitch of the blade; support means; a pair of controllably movable devices on each of said members, the members being biased by a torque on the propeller blade to a position in which one device on each member is held against the support means, the other devices being actuated by operation of the reciprocating means to intermittently assume the load from each said one device; means for translating the position of an unloaded device on each member; and means for altering the positions of the other devices when free of load according to the said translation to produce a translation of the members relative to the support means resulting in pitch adjustment of the propeller blade whereby speed of the propeller blade may be controlled.

5. The combination comprising a propeller blade; means for rotating the propeller blade to create thrust; reciprocating means driven by the blade rotating means; a member aligned in the direction of reciprocation, driven by the reciprocating means and operatively connected to adjust pitch of the blade; support means; a pair of controllably movable devices on said member, the member being biased by a torque on the propeller blade to a position in which one of the devices is loaded against the support means, the other device being actuated by operation of the reciprocating means to intermittently assume the load from said one device; speed responsive control means for translating the position of a device when unloaded on the member; and means for altering the position of the other device when free of load according to the said translation to produce a translation of the member relative to the support means resulting in pitch adjustment of the propeller blade whereby speed of the propeller blade may be controlled.

6. The combination as defined in claim 5 including scheduling means operatively connected to the speed control means for regulating the control means to maintain a desired speed of rotation of the propeller blade.

7. The combination comprising a propeller blade; means for rotating the propeller blade to create thrust; reciprocating means driven by the blade rotating means; a member aligned in the direction of reciprocation, driven by the reciprocating means and operatively connected to adjust pitch of the blade; support means; a pair of controllably movable devices on said member, the member being biased by a torque on the propeller blade to a position in which one of the devices is loaded against the support means, the other device being actuated by operation of the reciprocating means to intermittently assume the load from said one device; mechanism for translating the position of a device when unloaded on the member to adjust pitch of the propeller blade; speed and phase responsive control means for positioning said mechanism to control the speed and phase of the propeller blade in a desired manner; and means for altering the position of the other device when free of load according to the said translation.

8. The combination as defined in claim 7 including phase error detecting means, means operatively connected to said detecting means for integrating phase error with respect to time, and a connection between the integrating means and control means for actuating the control means according to integrated phase error.

9. The combination comprising a propeller blade; means for rotating the propeller blade to create thrust; reciprocating means driven by the blade rotating means; a member aligned in the direction of reciprocation, driven by the reciprocating means and operatively connected to adjust pitch of the blade; support means; a pair of controllably movable devices on said member, the member being biased by a torque on the propeller blade to a position in which one of the devices is loaded against the support means, the other device being actuated by operation of the reciprocating means to intermittently assume the load from said one device; phase responsive control means for translating the position of a device when unloaded on the member to adjust pitch so as to achieve desired phase regulation of the propeller blade; phase error detecting means; integrating means driven by the blade rotating means and operatively connected to actuate the phase responsive control means; and means for altering the position of the other device when free of load according to the said translation.

10. The combination comprising; drive means; mechanism expandable and contractable by the drive means; a member aligned in the direction of expansion and contraction, and reciprocable by said mechanism; support means; a pair of controllably movable devices on said member, the member being positionable by a load thereon in a position wherein one of the devices is loaded against the support means, the other device being actuated by said mechanism upon expansion thereof to assume the load from said one device; control means positionable upon contraction of said mechanism; actuable means movable upon expansion of said mechanism according to the positioning of the control means; energy storing means responsive to the movement of said actuable means; means operable by the energy storing means upon contraction of said mechanism for translating the said other device on the member; and means for altering the position of said one device when free of load according to the said translation to produce a translation of the member relative to the support means.

11. The combination as defined in claim 10 including braking means for holding the actuating means during contraction of said mechanism.

12. The combination as defined in claim 10 wherein the energy storing means comprises one or more springs.

13. The combination as defined in claim 10 wherein the energy storing means, and the means for altering the position of said one device when free of load each include one or more springs.

14. The combination comprising, drive means; mechanism expandable and contractable by the drive means; a member aligned in the direction of expansion and contraction, and reciprocable by said mechanism; support means; a pair of controllably movable devices on said member, the member being positionable by a load thereon in a position wherein one of the devices is loaded against the support means, the other device being actuated by said mechanism upon expansion thereof to assume the load from said one device; movable control means; means for translating, when unloaded, one or the other of said devices according to whether the control means is moved in one direction or another; and means for altering the position of the untranslated device when free of load according to the said translation.

15. The combination comprising drive means; mechanism expandable and contractable by the drive means; a member aligned in the direction of expansion and contraction, and reciprocable by said mechanism; support means; a pair of controllably movable devices on said member, the member being positionable by a load thereon in a position wherein one of the devices is loaded against one side or the other of the support means according to the direction of load, the other device being actuated by said mechanism upon expansion thereof to assume the load from said one device; movable control means; means for translating, when unloaded, one or the other of said devices according to whether the control means is moved in one direction or another and according to the direction of load on said member; and means for altering the position of the untranslated device when free of load according to the said translation.

16. The combination as defined in claim 15 wherein the translating means includes gearing for moving each device, and means for actuating the gearing for the one of the devices or the gearing for the other of the devices according to whether the control means is moved in one direction or another and according to the direction of the load on said member.

17. The combination comprising a propeller blade, means for rotating the propeller blade to create thrust, reciprocating means driven by the blade rotating means; a pair of members aligned in the direction of reciprocation, driven by the reciprocating means and operatively connected to adjust pitch of the blade; support means; a pair of controllably movable devices on each member, the members being biased by a torque on the propeller blade to positions in which one device on each member is loaded against one side or another of the support means according to the direction of the torque, the other devices being actuated by operation of the reciprocating means to intermittently assume the load from each said one device; movable control means; means for translating, when unloaded, one or the other of the devices on each member according to whether the control means is moved in one direction or another and according to the direction of the torque on the propeller blade; and means for altering the positions of the untranslated devices when free of load.

18. The combination comprising a propeller blade; means for rotating the propeller blade to create thrust; reciprocating means; drive means for operating the reciprocating means, said drive means being operatively connected to the blade rotating means; a member aligned in the direction of reciprocation, driven by the reciprocating means and operatively connected to adjust pitch of the blade; support means; a pair of controllably movable devices on said member, the member being biased by a torque on the propeller blade to a position in which one of the devices is loaded against the support means, the other device being actuated by operation of the reciprocating means to intermittently assume the load from said one device; movable control means; means for translating, when unloaded, one or the other of said devices according to whether the control means is moved in one direction or another; means for altering the position of the untranslated device when free of load according to the said translation to produce a translation of the member relative to the support means resulting in pitch adjustment of the propeller blade; and means for operatively connecting the input signal means to the said drive means for causing the propeller blade to be moved into a further position.

19. The combination comprising a propeller blade; means for rotating the propeller blade to create thrust; reciprocating means; drive means for operating the reciprocating means, said drive means being operatively connected to the blade rotating means; mechanism expandable and contractable by the drive means; a control member positionable during contraction of said mechanism; means energized by expansion of said mechanism for positioning the propeller blade according to the positioning of the control member; and means for operatively connecting the control member to the said drive means for causing the propeller to be moved to a feather position.

20. The combination comprising a propeller blade; means for rotating the propeller blade to create thrust; reciprocating means; drive means for operating the reciprocating means, said drive means being operatively connected to the blade rotating means; mechanism expandable and contractable by the drive means; a control cam positionable during contraction of said mechanism; and means energized by the said control cam upon expansion of said mechanism for adjusting pitch of the propeller blade according to the positioning of the control cam.

No references cited.

JULIUS E. WEST, *Primary Examiner.*